June 16, 1925. 1,542,238
W. G. GRIFFETH
UNIVERSAL JOINT
Filed Nov. 8, 1923
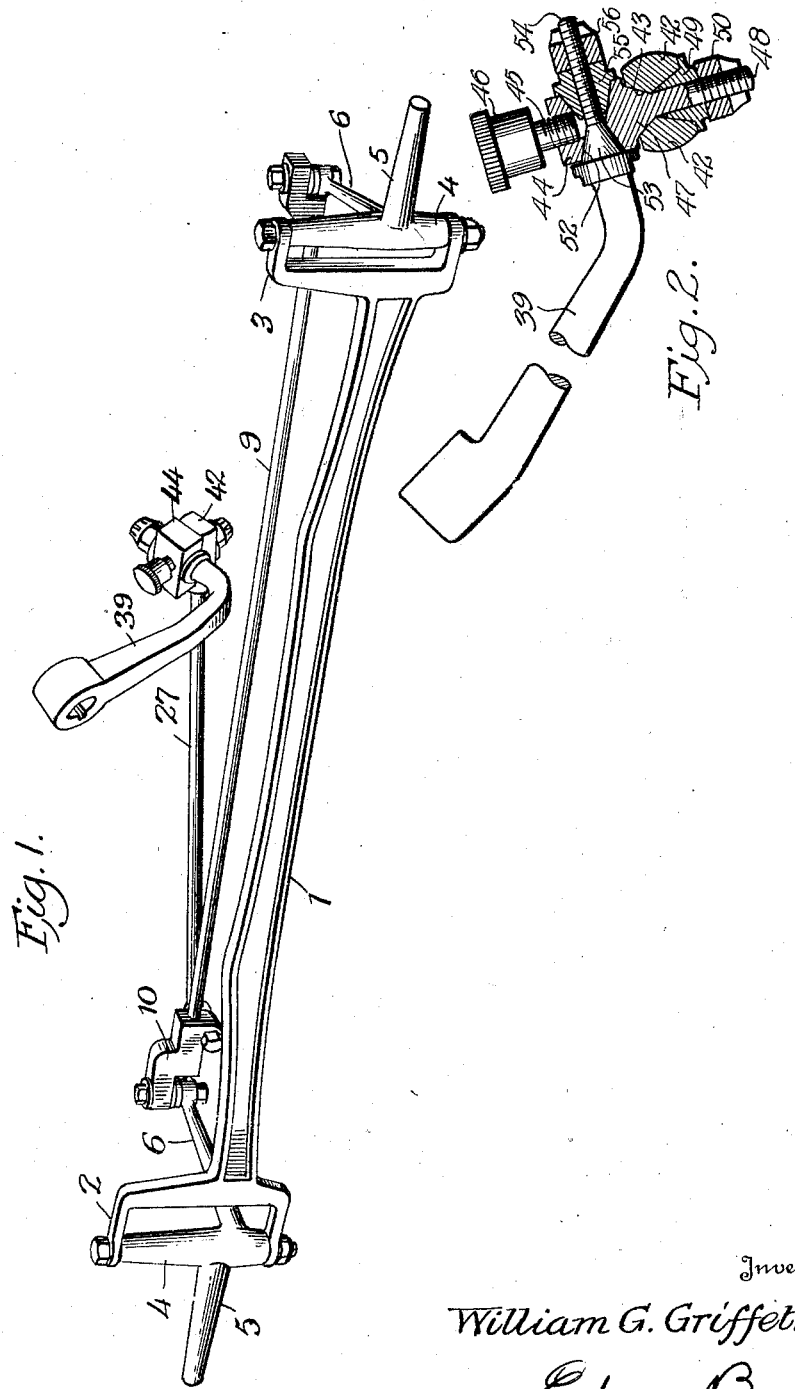
Inventor
William G. Griffeth,
By Edson Bros.
Attorneys Patented June 16, 1925.

UNITED STATES PATENT OFFICE.

WILLIAM G. GRIFFETH, OF CHARLOTTE, NORTH CAROLINA, ASSIGNOR TO ROBERT L. CARITHERS, OF WINDER, GEORGIA.

UNIVERSAL JOINT.

Application filed November 8, 1923. Serial No. 673,459.

*To all whom it may concern:*

Be it known that I, WILLIAM G. GRIFFETH, a citizen of the United States, residing at Charlotte, in the county of Mecklenburg and State of North Carolina, have invented certain new and useful Improvements in Universal Joints, of which the following is a specification.

My invention relates to improvements in universal joints, and more especially to universal joints of the type used in automobile steering mechanism but not necessarily restricted to this use.

An important object of my invention is the provision of a device of this character which is capable of free movement with no limit of its rotation in either direction.

Another object of my invention is to provide a device of the above mentioned character which will be strong and durable in use and adjustable to take up wear.

Still other objects and advantages of the invention will appear from the following description taken in connection with the accompanying drawings which illustrate, by way of example, preferred embodiments of the invention, but which are not to be construed as definitions of the limits of the invention, reference being had to the appended claims for that purpose.

In the drawings,

Figure 1 is a perspective view illustrating an embodiment of the invention as it is applied, for example, to an automobile, and illustrating the front axle thereof.

Fig. 2 is a side elevation partly in section of the crank arm actuated by the steering wheel and showing its connection to the tie rod.

The invention will be described to illustrate, by way of example, its application to a motor vehicle.

Referring in detail to the accompanying drawings, the reference numeral 1 indicates the front axle of a motor vehicle and may be of any desired or standard form. The axle 1 is provided at each of its ends with steering knuckles 2 and 3 comprising vertical posts 4 set in the forked ends of the axle 1 and each having extending laterally thereof hubs 5 upon which the wheels of the vehicle are rotatably mounted. The construction thus far described may be of any convenient or usual form.

Each of the posts 4 has affixed thereto in any suitable manner a substantially horizontally rearwardly extending steering knuckle arm 6 which is pivotally connected to the tie rod 9 in any suitable manner, here shown as the coupling 10 which also serves to connect the drag line 27 to the tie rod 9.

Rotatably connected to the drag link 27, at its outer end is a crank arm 39 Fig. 2.

The crank arm 39 may be connected to the drag link in the following manner. A bolt receiving block 42 may be formed integrally with the drag link 27 or may be screw threaded over the outer end thereof, and may be provided with an opening therethrough which may be of double cone shape, as shown at 43 in Fig. 2, for the reception of one end of a block bolt 44, the construction of which is shown in detail in Fig. 9. The block bolt 44 may have an internally screw threaded opening in one end for the reception of the stem 45 of a grease cup 46, and is preferably tapered inwardly at 47 down to the reduced cylindrical and externally screw threaded end 48. The end 48 of the block bolt 44 is inserted in the double cone shaped opening 43 provided in the drag link block 42, after which the cone bushing 49 is screw threaded over the end 48 of the bolt until it comes into close, but rotatable, contact with the other portion of the double cone shaped opening 43, at which point it is retained in position by the lock nut 50.

The block portion of the block bolt 44 may be transversely bored to provide a double cone shaped opening 52 to receive the lower end of the crank arm 39 which is preferably formed with the integral cone shaped portion 53 and the reduced and screw threaded end 54. A tapered bushing or cone 55 is then screwed into place over the end 54 until the end of the crank arm 39 is tightly but rotatably fitted within the block bolt 44, in which position the parts are retained by the lock nut 56. The crank arm 39 and the block bolt 44 are thus rotatable together in the drag link block 42; and the crank arm 39 is independently rotatable in the block bolt 44 about an axis transverse to the axis of the block bolt.

In operation, when the relatively rotatable parts become loose from wear, they may be readily tightened by loosening the appropriate lock nut and screwing in the cone bushing until the parts become tight again, and then locking them in this position by the lock nut, thus keeping the parts tight and eliminating objectionable rattling. The double tapered universal connection between the crank arm 39 and the drag link 27 provides a freedom of movement of these parts which very greatly reduces the effort of steering, and has the effect of making a light car capable of being steered very easily and with a minimum of effort not only over a smooth surface, but also through sand, or over rough ground.

The invention may not only be embodied in the steering mechanism of a car during its manufacture, but may also be readily applied to cars now in use by simply removing certain parts of the steering mechanism and substituting others herein described.

What is claimed is:

1. In a steering mechanism, a drag link, and means for connecting said drag link to the crank arm of a steering wheel comprising a portion on said drag link having an opening tapering inwardly from both sides to form a double cone shaped opening, a block bolt having a cone shaped end rotatably mounted in said opening, said block bolt having a reduced portion adapted to receive a cone shaped bushing, the other end of said block bolt having a transverse double cone shaped opening therein, and a crank arm having a conical portion rotatably mounted in said transverse opening and having a reduced extension adapted to receive a cone shaped bushing.

2. A universal joint comprising a member having a double cone shaped opening therein, a block bolt having a cone shaped end rotatably mounted in said opening, said block bolt having a reduced portion adapted to receive a cone shaped bushing, the other end of said block bolt having a transverse double cone shaped opening therein and a member having a conical portion rotatably mounted in said transverse opening and having a reduced extension adapted to receive a cone shaped bushing.

In testimony whereof I affix my signature.

WILLIAM G. GRIFFETH.